J. R. STEPHENSON.
CHANGE OF SPEED DEVICE.
APPLICATION FILED AUG. 11, 1919.
1,437,120.
Patented Nov. 28, 1922.
3 SHEETS—SHEET 2.
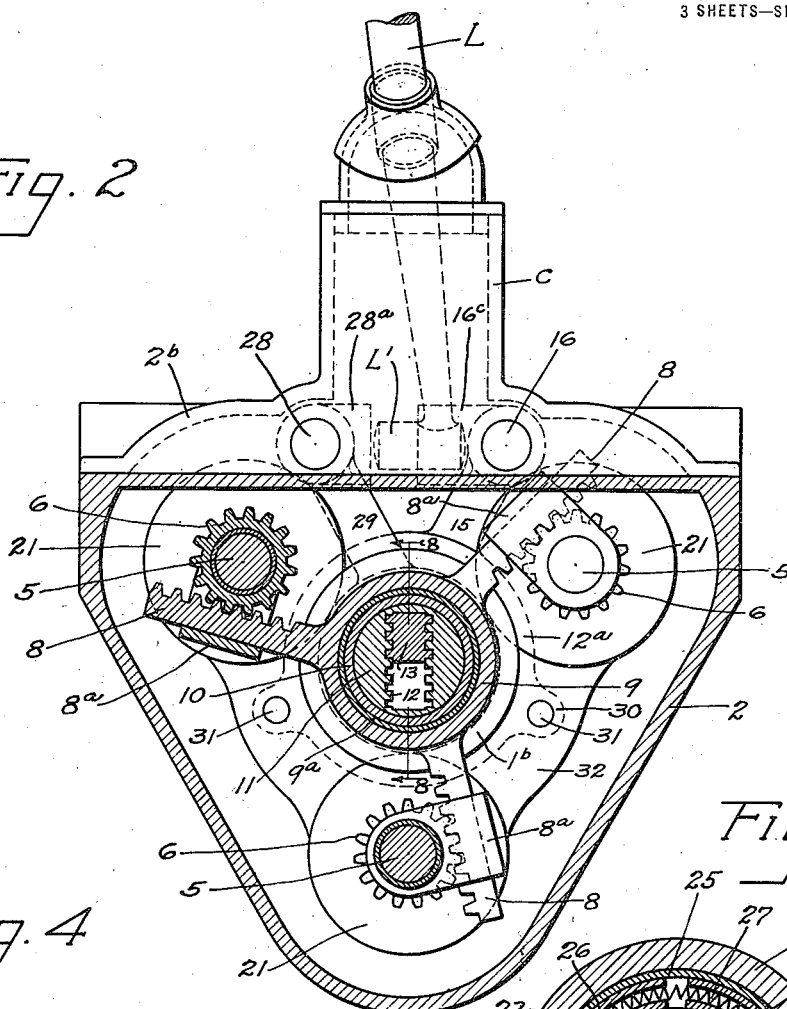
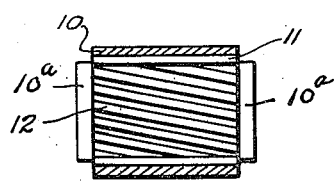
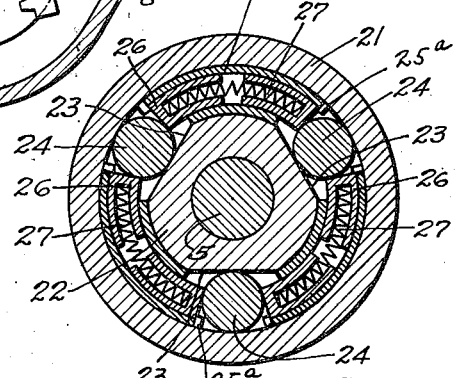
Witness
Chas. J. Milch
Inventor
James R. Stephenson
By Staley & Bowman
Attorneys

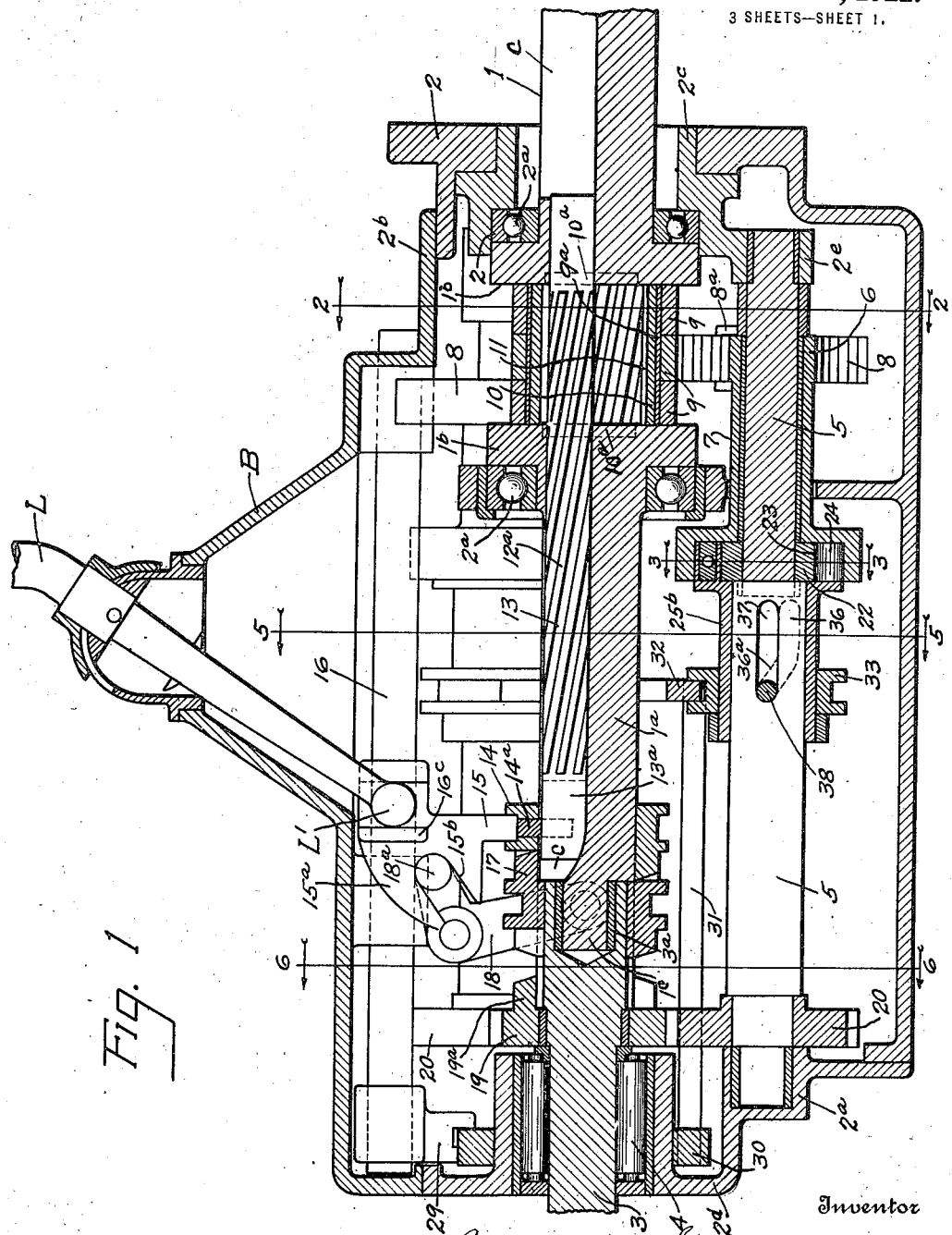

J. R. STEPHENSON.
CHANGE OF SPEED DEVICE.
APPLICATION FILED AUG. 11, 1919.

1,437,120.

Patented Nov. 28, 1922.
3 SHEETS—SHEET 3.

Witness
Chas. J. Welch

Inventor
James R. Stephenson
By Staley & Bowman
Attorneys

Patented Nov. 28, 1922.

1,437,120

UNITED STATES PATENT OFFICE.

JAMES R. STEPHENSON, OF DAYTON, OHIO, ASSIGNOR OF TWO-THIRDS TO THE MONARCH ENGINEERING COMPANY, OF DAYTON, OHIO, A CORPORATION OF OHIO.

CHANGE-OF-SPEED DEVICE.

Application filed August 11, 1919. Serial No. 316,678.

*To all whom it may concern:*

Be it known that I, JAMES R. STEPHENSON, a citizen of the United States, residing at Dayton, in the county of Montgomery and State of Ohio, have invented certain new and useful Improvements in Change-of-Speed Devices, of which the following is a specification.

This invention relates to improvements in change of speed devices for the transmission mechanism of motor driven vehicles, lathes, milling machines, or other machines in which a change of speed is necessary; it more particularly relating to improvements upon my Letters Patent No. 1,189,401 dated July 4th, 1916.

An object of my invention is to simplify the construction of and make more effective the operation of devices of this character.

A further object of my invention is to improve the construction shown in my former patent by providing for throwing out of operation or rendering idle parts of the driving mechanism when the devices have been shifted to a direct drive between the driving and driven members.

A further object of my invention is to provide, in an arrangement where a plurality of counter shafts are employed for transmitting motion from the driving to the driven shaft, means for driving said counter shafts from a common variable eccentric.

Further objects of my invention will appear from the accompanying drawings and description.

In the accompanying drawings:—

Fig. 1 is a longitudinal section of a mechanism embodying my improvements.

Fig. 2 is a section on the line 2—2 of Fig. 1.

Fig. 3 is a section on the line 3—3 of Fig. 1.

Fig. 4 is a longitudinal section of the eccentric member.

Figure 5:
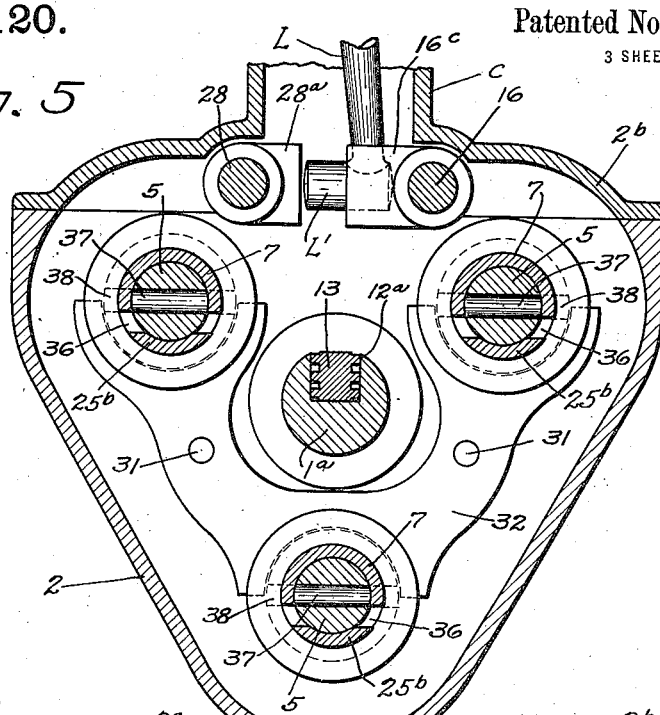
Fig. 5 is a section on the line 5—5 of Fig. 1.
Figure 6:
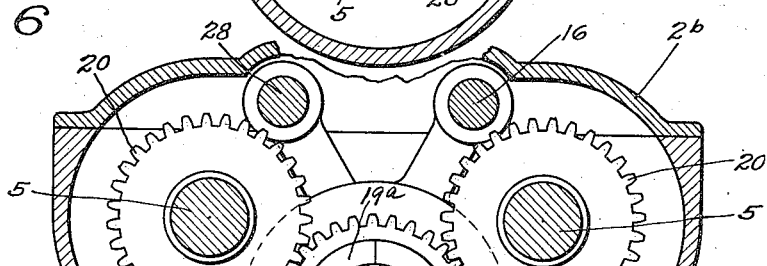
Fig. 6 is a section on the line 6—6 of Fig. 1.

The change of speed mechanism shown in the present case is one particularly adapted for motor vehicle transmissions although with some modifications the principles thereof are applicable to change of speed devices for other mechanism. The driving shaft, which may be connected to the motor in any suitable way, is formed in two parts or halves 1 and 1$^a$, which are mounted in anti-friction bearings 2$^a$ in a bracket 2$^c$ of a casing 2, of any suitable construction, having a removable cover 2$^b$; and end cap 2$^d$, the two shaft members being rotatably connected in a manner hereinafter described. The driven shaft, which in the present case leads to the differential gearing, is represented by 3, being mounted in suitable anti-friction bearings 4 in the cap 2$^d$ of the casing; the forward end of the shaft 3 being chambered and provided with a bushing 3$^a$ to receive the reduced rear end 1$^c$ of the shaft member 1$^a$ to form an additional support and bearing for that shaft member. Located about the driving shaft are counter-shafts 5, three in number in the present case, having their ends journaled in bearings 2$^e$ in the bracket 2$^c$. Each of these counter-shafts has loosely mounted thereon a sleeve 7 provided with an integrally formed pinion or segment 6, meshing with a rack 8 which extends through a guiding loop 8$^a$.

Figure 7:
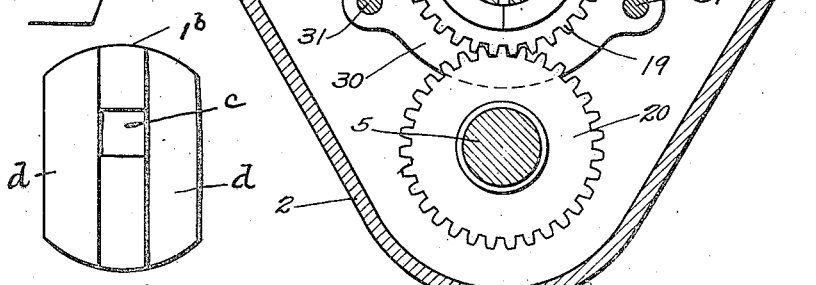
Fig. 7 is an end view of one of the driving shaft flanges.

Each rack has an integrally formed strap 9 which surrounds a bushing 9$^a$ placed about a variable eccentric member which is preferably formed of two sleeves 10 and 11 suitably secured together, the sleeve 11 being in two halves or parts constituting a connector for the two sections of the driving member. The driving shaft members 1 and 1$^a$ are each provided at their adjacent ends with a flange 1$^b$ between which the eccentric is located so as to confine the same against longitudinal movement and to which it is also revolubly connected by means of the segmental projections 10$^a$ on each end of the sleeve 10 which fit in depressions $d$ formed in the face of each of the flanges 1$^b$ as shown in Fig. 7. The eccentric sleeve members 11 have an inner rectangular shaped bore through which extends a longitudinal shiftable bar 13, which acts as an adjusting device, square in cross-section, which is located in square channels $c$ in each of the driving shaft members 1 and 1$^a$, as shown in Figs. 2 and 4, the side walls of the channel or bore in the eccentric member are provided with a series of inclined ribs 12 in mesh with a series of inclined ribs 12$^a$ on the sides of the bar 13. Provision is made for shifting this bar 13 longitudinally in either direction so as to vary the eccentricity of the eccentric members for the purpose of varying the throw of the racks 8 and hence the speed of oscillation of the sleeves 7, and also for positioning the eccentric in concentric position for direct drive. The rear end of the bar 13 has a grooved collar 14 having clutch faces on the rear end thereof and provided with a pin 14$^a$ which extends into an elongated slot 13$^a$ (shown in dotted lines in Fig. 1). In the groove of the collar there is a yoke 15 connected with a slidable bar 16 located in suitable guides on the cover 2$^b$. A hand lever L pivotally mounted on a bracket B on the cover has a loose connection through the rounded T-shaped head L' at its lower end with a groove formed by projections 16$^c$ on the shifting rod 16 so that when the hand lever is manipulated the bar 13 can be moved forwardly or rearwardly for the purpose explained.

Splined to the driven shaft 3 is an intermediate clutch member 17 provided with clutch faces at each end thereof and having a groove within which extends the forked or yoked end of a bell-crank lever 18. The other arm of the bell crank lever has a lateral projection 18$^a$ which extends into a groove formed by the projections 15$^a$ and 15$^b$ extending from the yoke member 15 so that the intermediate clutch will be shifted with the shifting of the clutch collar 14 and bar 13, but slightly prior thereto by reason of the slot 13$^a$, for the purpose to be explained. Loosely mounted upon the driven shaft 3 is a gear 19 which meshes with a gear 20 on the rear end of each counter shaft 5; this gear 19 being provided with clutch faces 19$^a$.

In the position shown in the drawings, the parts are in the position for direct drive; the sleeve members 10 and 11 being in concentric position relatively to the drive shaft members so that no movement is being imparted to the racks; the drive being through the clutch collar 14 and intermediate clutch member 17, to the driven shaft 3. If now the lever L is shifted rearwardly the first movement thereof will be to shift the intermediate clutch member out of engagement with the teeth on the collar 14 and into engagement with the clutch teeth 19$^a$ on the hub of the gear 19, this preliminary shifting being permitted by reason of the elongated slot in the bar 13. Further shifting of the lever L moves the bar 13 forwardly and, by reason of the inclined intermeshed ribs on the bar and eccentric, the eccentric will be thrown to eccentric position and thereby reciprocate the racks 8 to oscillate the sleeves 7 and impart a rotary movement to the counter-shafts by the clutches to be later described, the rotation of the counter-shafts being imparted to the driven shaft 3 through the gears 20 on the counter shafts, loose gear 19 and intermediate clutch member 17 which is splined to the driven shaft 3. In starting, the shifting lever will be, of course, manipulated to give but a comparatively slight degree of eccentricity to the eccentric and then shifted further to increase that degree as the vehicle gets under headway. When the vehicle has reached sufficient speed, the shifting lever L may be thrown forwardly so as to again throw the parts in a position for direct drive.

When the lever L is thrown to neutral position, it centers the intermediate clutch member between the clutch collar 14 and clutch faces 19$^a$ on the gear 19 so that no motion will be imparted to the driven shaft, and, by reason of the fact that the collar 14 is allowed a limited movement free of the sliding bar 13, no movement will be imparted to the countershafts and connected driving devices in this neutral position.

Each of the sleeves 7 has an enlarged housing 21 and each shaft 5 has a collar 22 within the housing provided with a series of flat faces 23, between which faces and the inner periphery of the housing are located rollers 24. A roller cage 25 is journaled on the interior of the housing and carries slidably mounted therein a series of plungers 26, arranged in pairs between the respective rollers, with springs 27 interposed between the closed ends of each pair of plungers. Stops 25$^a$ are provided on the cage for each plunger, these stops being located closely adjacent the respective sides of each roll. The cage has an extended sleeve portion 25$^b$ arranged about the countershaft 5 and provision is made for rotating this sleeve and hence the cage and plungers therein so as to move the rollers 24 either way on the straight surfaces 23 so as to cause the sleeve 7 to grip the counter-shaft collar 22 upon either one or the other of its oscillatory movements. Referring to Figs. 2, 5 and 6 28 represents a second shifter rod arranged to be engaged by the shifting lever L, which may be shifted lateraly as well as forwardly and rearwardly in a well known way; the rod 28 having a groove formed by projections 28$^a$ to receive one end of the T-head L'. The degree of lateral movement of the lever L, however, is such as to still leave the head L' in engagement with collar 16$^c$ so that both rods will be moved simultaneously. The shifter rod 28 has at its rear end a yoke 29, as shown in Fig. 1, which has a connection with a ring 30 located about the inner hub portion of the end cap 2$^d$. This ring 30 is connected by a pair of rods 31 to a triple yoke member 32, as shown in Figs. 1 and 5, each yoked portion of this member 32 straddling a grooved collar 33 on each of the extended roller cage sleeve portions 25ᵇ. Each of the extended sleeve portions 25ᵇ has a slot 36 provided with an inclined portion 36ᵃ and the countershaft has a slot 37. A pin 38 on the collar 33 projects through both of these slots. In the position of the parts shown in Fig. 1, the cage is in the position to so shift the rollers 24 as to impart a forward drive to the countershaft 5 or in a position to cause the sleeve 7 to grip the collars 22 upon the forward oscillation of the sleeves. When the shifter rod 28, however is shifted the pins 38 on each of the collars 33 will ride on the inclined portion 36ᵃ of the slot 36 with a cam action and rotate the sleeve 25ᵇ and hence the roller cage. This causes the plungers to move the rollers to a position so that the housing of the sleeve 7 will grip the collar 22 of the counter shaft upon the reverse rotation of the sleeve 7 and thus impart a reverse motion to the countershaft. By reason of the elongated slots in the bar 13, the initial movement of the operating lever L causes the reversal of the rollers in the manner described, or, in other words, permits the pins 38 to complete their movement on the inclined portions 36ᵃ of the slots 36, before the movement of the shifting bar 13 begins. Continued movement of the shifting lever L is permitted by reason of the straight portions of the slots 36 and the slots 37 to allow the eccentric to be shifted to the desired degree; it being seen that, if desired, approximately high speed may be secured upon the reverse drive of the mechanism, which is desirable in some classes of machines. After the required reverse drive is had, the lever L will be shifted to neutral position to arrest the parts, and then laterally to disengage the reversing rod 28 therefrom, so that the parts will be in a position for direct drive. If desired, the operating lever L may be manipulated so as to center the clutch rollers in the double wedge-shaped pockets, or place them in neutral position, which arrangement may also be found desirable and necessary in connection with certain types of change of speed mechanism.

Having thus described my invention, I claim:—

1. In a device of the character described, a driving member, a driven member, variable motion transmitting mechanism between said members which includes a variable eccentric member, a rack having a strap about said eccentric member, and connections for transmitting the movement of said rack to said driven member, means for varying the movement of said eccentric member and also for placing same in concentric relation with said driving member, and additional connections between said driving and driven members for furnishing a direct drive to said driven member when said eccentric member is in concentric position.

2. In a device of the character described, a driving member, a driven member, a variable motion transmitting mechanism between said members consisting of a variable eccentric, a rack and a strap in operative relation with said eccentric, a countershaft in driving relation with said driven shaft, a loose sleeve on said countershaft, a toothed connection between said sleeve and rack, and a reversible ratchet device between said sleeve and countershaft together with means for reversing said ratchet for changing the direction of rotation of said countershaft.

3. In a device of the character described, a driving shaft formed of two parts, a slidable member between said shaft parts together with means for sliding the same, a driven shaft, variable speed devices between said driving shaft and said driven shaft including a variable eccentric member located between the two parts of said driving shaft, and a connection between said slidable member and said variable eccentric member for varying the eccentricity of said eccentric member.

4. In a device of the character described, a driving member and a driven member, connections between said members including ratchet devices for converting a reciprocatory movement into a rotary movement, said ratchet devices comprising rollers arranged in double wedge-shaped pockets, a cage for said rollers, spring pressed plungers carried by said cage arranged on each side of each of said rollers, stops for said plungers carried by said cage in proximity to said rollers, and means for rotating said cage in either direction, for the purpose specified.

5. In a device of the character described, a driving member, a driven member, a variable eccentric together with means for varying the eccentricity of the same, driven by said driving member, connecting devices between said variable eccentric and the driven member, reversing mechanism associated with said parts, and a single controlling device for throwing said variable eccentric and its connections into and out of operation and for also manipulating said reversing mechanism.

6. In a device of the character described, a driving member, a driven member, a variable eccentric located on said driving member, a plurality of countershafts, eccentric straps on said eccentric connected with said countershafts by racks and pinions and clutches for imparting rotary movement to said countershafts, means for reversing the action of the clutches, and a single controlling lever for varying said eccentric and for also operating said reversing means.

7. In a mechanism of the character described, a driving member, a driven member, a plurality of countershafts, a gear loosely mounted on said driven member, pinions rotatably connected with said countershafts in mesh with said loose gear, change of speed mechanism between said driving member and said countershafts, a clutch member on said driving member and clutch faces associated with said loose gear, and a shiftable clutch member rotatably connected with said driven member for connecting either said driving member clutch with said driven member or said loose gear with said driven member.

8. In a mechanism of the character described, a driving member, a driven member, a plurality of countershafts, a gear loosely mounted on said driven member, pinions rotatably connected with said countershafts in mesh with said loose gear, change of speed mechanism between said driving member and said countershafts, a movable clutch member on said driving shaft operable to control said change of speed mechanism, clutch faces associated with said loose gear, and a shiftable clutch member rotatably connected with said driven member for connecting either said driving member clutch with said driven member or said loose gear with said driven member.

9. In a mechanism of the character described, a driving member, a driven member, a plurality of countershafts, a gear loosely mounted on said driven member, pinions rotatably connected with said countershafts in mesh with said loose gear, change of speed mechanism between said driving member and said countershafts, a shiftable clutch member rotatably connected with said driving shaft and operatively connected with said change of speed mechanism to throw the same in or out of operation and an intermediate shiftable clutch member rotatably connected with said driven member for connecting said driving shaft clutch with said driven member when said change of speed mechanism has been thrown out of operation or for connecting said loose gear with said driven member when said change of speed mechanism has been thrown into operation.

10. In a mechanism of the character described, a driving member, a driven member, a plurality of countershafts, change of speed mechanism between said driving member and said countershafts, a slidable clutch member rotatably connected with said driving member and operatively associated with said change of speed mechanism to throw the same into and out of operation, a clutch member loosely associated with said driven member and rotatably connected with said countershafts, a shiftable intermediate clutch member rotatably connected with said driven member, a single controlling device operatively connected with said intermediate clutch member and also with said driving clutch member whereby when said controlling device is thrown in one direction said driving clutch member will be shifted to throw said change of speed mechanism into operation and said intermediate clutch will be thrown into engagement with the driven member clutch and when said controlling device is shifted to another position said driving shaft clutch and intermediate clutch will become engaged and said change of speed mechanism thrown out of operation.

In testimony whereof, I have hereunto set my hand this 7th day of August, 1919.

JAMES R. STEPHENSON.

Witnesses:
 EDWARD J. DE VILLE,
 VERGIL SCHAEFFER.